United States Patent
Matsui et al.

(10) Patent No.: US 7,199,829 B2
(45) Date of Patent: Apr. 3, 2007

(54) DEVICE AND METHOD FOR PROCESSING UNPROCESSED IMAGE DATA BASED ON IMAGE PROPERTY PARAMETERS

(75) Inventors: Seiichi Matsui, Asaka (JP); Tadashi Fujii, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 681 days.

(21) Appl. No.: 09/800,736

(22) Filed: Mar. 8, 2001

(65) Prior Publication Data
US 2001/0020978 A1   Sep. 13, 2001

(30) Foreign Application Priority Data
Mar. 8, 2000   (JP) .............................. 2000-063093

(51) Int. Cl.
H04N 5/222  (2006.01)
(52) U.S. Cl. ................................ 348/333.02
(58) Field of Classification Search ............ 348/184, 348/185, 207.99, 333.02, 333.12, 231.99, 348/231.9; 382/168
See application file for complete search history.

(56) References Cited
U.S. PATENT DOCUMENTS
4,671,655 A * 6/1987 Heard .................... 356/227
6,285,398 B1 * 9/2001 Shinsky et al. .......... 348/223.1
6,288,743 B1 * 9/2001 Lathrop ................... 348/231.9
6,657,658 B2 * 12/2003 Takemura .............. 348/207.99

FOREIGN PATENT DOCUMENTS
JP   8317276    11/1996
JP   11-88672   * 3/1999

* cited by examiner

*Primary Examiner*—Vivek Srivastava
*Assistant Examiner*—James M. Hannett
(74) *Attorney, Agent, or Firm*—Birch, Stewart, Kolasch & Birch, LLP

(57) ABSTRACT

An image signal outputted from a CCD is converted into a digital signal by an A/D converter via a sampling hold circuit. After A/D conversion, the image data before image processing is stored in a first memory. A signal processing part performs image processing with respect to the unprocessed image data read out from the first memory in view of image property parameter data in accordance with an instruction from a CPU. The image after the image processing is displayed on a display. The user looks at the displayed image and selects, through an image property setting device, an image property parameter that the user desires, then inputs instructions such as change of parameter and adjustment. The signal processing part executes re-processing with respect to the unprocessed image data read out from the first memory, in accordance with new image property parameter data that is newly set by the user. The image property parameters are: white balance, gradation, gain, tonality, sharpness, and so forth.

20 Claims, 5 Drawing Sheets

DEVICE AND METHOD FOR PROCESSING UNPROCESSED IMAGE DATA BASED ON IMAGE PROPERTY PARAMETERS

BACKGROUND OF THE INVENTION

1. Field of the Invention

The present invention relates to an electronic camera, particularly to an electronic camera such as a digital camera which converts an optical image into an electronic signal with an imaging device and records the image data.

2. Description of Related Art

In a conventional digital camera, each of parameters related to image properties such as white balance (WB), gradation, brightness, tonality, and sharpness is set at a standard level beforehand. A digital camera is also known that is capable of changing the image property parameters depending on a subject to be captured and preference of the user.

Japanese Patent Application Laid-open No. 8-317276 discloses an electronic camera that changes the image properties such as a white balance by switching a capturing mode in accordance with the subject to be captured in a case where the subject is a screen of an oscilloscope or a screen of a television monitor.

However, the conventional camera that can change the image property parameters requires adjustment of the image property parameters before the image-capturing. Then, if the properties of the image that is captured after the adjustment are not satisfying to the user, the image property parameters must be re-adjusted and image-capturing must be performed again, or, the recorded image must be corrected by using an image processing application software with a personal computer.

Such conventional processing is bothersome, and besides the user may lose a good opportunity to capture images. Further, if the recorded image is processed by using the image processing application software after the image recording, the image quality is deteriorated.

SUMMARY OF THE INVENTION

The present invention has been developed in view of the above-described objects, and has as its object the provision of an electronic camera which can reset image property parameters of an image that has been captured once without deteriorating the quality of the image.

In order to achieve the above-described object, the present invention is directed to an electronic camera, comprising: an imaging device which converts an optical image into an analog image signal; an A/D converter which converts the analog image signal outputted from the imaging device into a digital image signal; an unprocessed data storing device which stores the digital image signal outputted from the A/D converter as unprocessed image data; a signal processing device which processes the unprocessed image data read out from the unprocessed data storing device into a processed image data in accordance with an image property parameter; an image property setting device through which an instruction is inputted to change data of the image property parameter; and a display which displays an image represented by the processed image data processed by the signal processing device in accordance with the data of the image property parameter set with the image property setting device.

According to the present invention, an image of a subject is captured by the imaging device, and the image signal representing the subject image is outputted from the imaging device. The image signal is converted into a digital signal by the A/D converter, and is stored by the unprocessed data storing device as raw data (unprocessed image data) from the imaging device. The signal processing with respect to the unprocessed data is performed in the signal processing device in view of the image property parameter data, and the result of the processing is displayed on the display.

The user can input instructions through the image property setting device such as change of the image property parameter and adjustment while checking the processed image displayed on the display. Based on the image property parameter data that is set by the user, the signal processing device tries the image processing once more in accordance with the data of new image property parameter by reading out the unprocessed image data from the unprocessed data storing device. Thereby, the image property parameter can be corrected without deteriorating the quality of the image. As to the image property parameters, there are white balance, gradation, gain, tonality, sharpness, and so forth.

As one embodiment for the present invention, the electronic camera further comprises a recording device which records, in a record medium, the processed image data processed by the signal processing device in accordance with the data of the image property parameter set with the image property setting device. Moreover, in another embodiment for the present invention, the electronic camera further comprises a recording device which records, in a record medium, the unprocessed image data and the data of the image property parameter set with the image property setting device, with associating the unprocessed image data and the data of the image property parameter with each other.

The unprocessed data storing device may be an internal memory built in the electronic camera, or an external record medium (removable media) detachably connected to the electronic camera. Yet another embodiment is preferable in which the display displays at least one of histogram, average level, peak level, and bottom level, of the analog image signal.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Hereunder a preferred embodiment of for an electronic camera of the present invention will be described in detail in accordance with the accompanied drawings.

Figure 1:
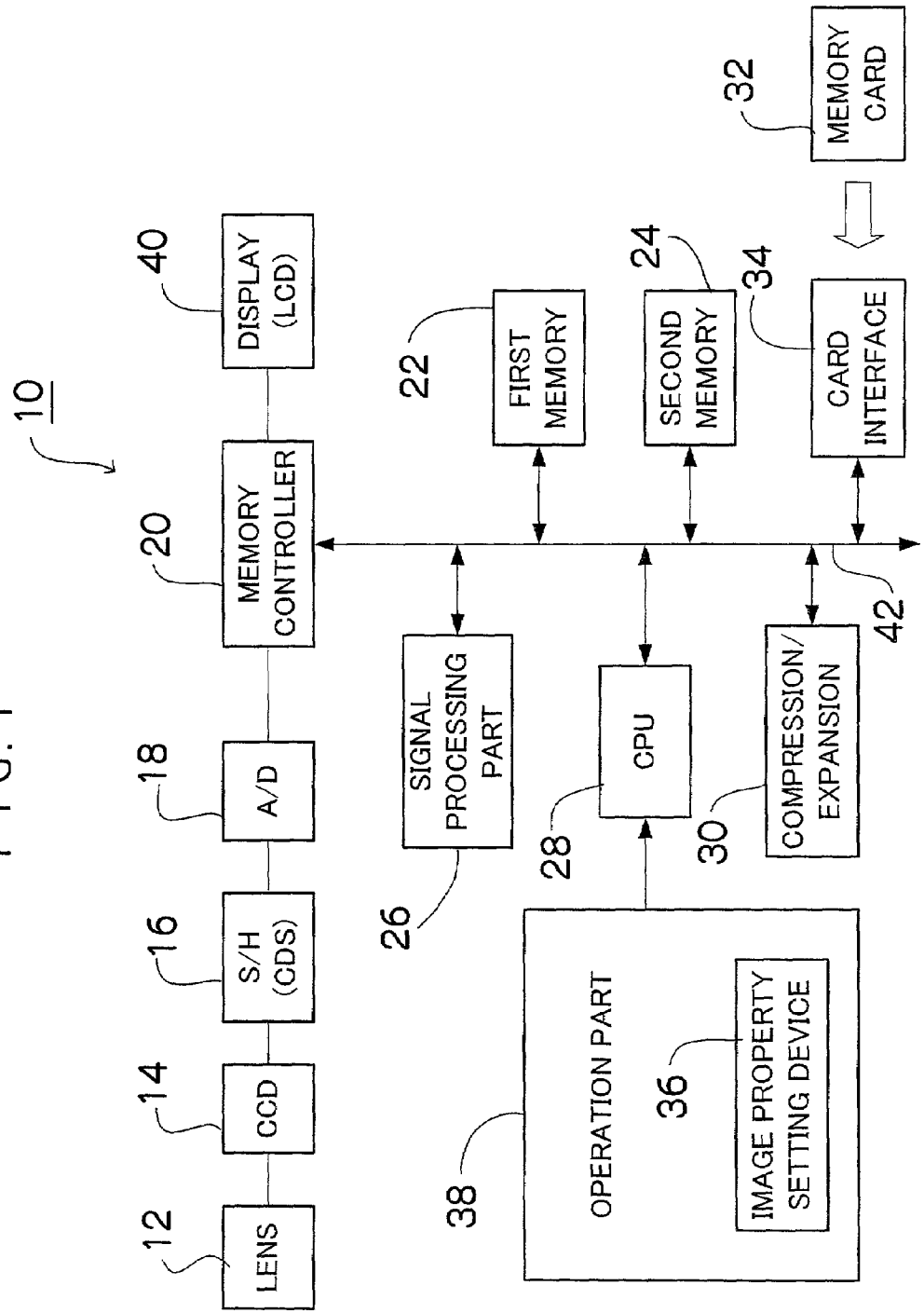
FIG. 1 is a block diagram showing an electronic camera according to an embodiment of the present invention.

FIG. 1 is a block diagram showing an embodiment of an electronic camera of the present invention. The electronic camera 10 comprises a taking lens 12, a CCD 14 as an imaging device, a sampling hold circuit 16, an A/D converter 18, a memory controller 20, a first memory 22, a second memory 24, a signal processing part 26, a central processing unit (CPU) 28, a compression-expansion circuit 30, a card interface 34 to which a memory card 32 is detachably connected, an operation part 38 including an image property setting device 36 and other instruction input device, and a display 40 for displaying a captured image and the like.

The taking lens 12 is constructed of one or plural lenses, or may be of a single focus lens (fixed focus), or may be a lens that can change a focal length such as a zoom lens or a lens that can change a focal length in two ways that are telephoto/widephoto.

An image of the subject that is formed on a light receiving surface of the CCD 14 through the taking lens 12 is converted by each of sensors into a signal charge in an amount corresponding with an amount of incident light. The signal charge is accumulated and is read out by a read gate pulse applied from a CCD driving circuit (not shown), and is sequentially outputted from the CCD 14 as a voltage signal (analog imaging signal) that corresponds with the signal charge.

The CCD 14 is provided with a shutter drain through a shutter gate, and the accumulated signal charge is swept out to the shutter drain by driving the shutter gate by the shutter gate pulse. In other words, the CCD 14 has a so-called electronic shutter function, which controls accumulation time (shutter speed) of the electric charge accumulated in the sensors by the shutter gate pulse.

The analog imaging signal that is read out from the CCD 14 is transmitted to the sampling hold circuit 16, and is processed through a correlative double sampling (CDS) and through a color separation into color signals of R, G, and B. The imaging signal is processed through the sampling hold for each pixel and is converted into R, G, and B digital signal in the A/D converter 18, then is stored in the first memory 22 through the memory controller 20 before the image processing.

At that time, the data stored in the first memory 22 is unprocessed after the A/D conversion. That is, the data stored in the first memory 22 is unprocessed data, which has not been processed through image signal processing related to image property adjustment such as gradation conversion, brightness correction, and tonality correction. The unprocessed data is hereunder called "CCD-raw data"; but such "unprocessed data" does not exclude all the signal processed. For example, the data that is obtained by an amending process for supplementing data that covers a defective pixel (damage) in the CCD 14 is included in the concept of the "CCD-raw data" since such data has not been processed through the image processing related to image property adjustment.

The data stored in the first memory 22 is transmitted to the signal processing part 26 through the memory controller 20. The signal processing part 26 obtains from the CPU 28 data related to image property parameters, and processes the received CCD-raw data in accordance with the image property parameter data which is currently set. The CPU 28 has a predetermined initial setting value (standard setting value) with respect to each of the image property parameters, and the CCD-raw data is processed referring to the predetermined initial setting values when the user does not give an image property changing instruction with the image property setting device 36.

The image data that is obtained as a result of execution of image processing by the signal processing part 26 in view of the data of the image property parameters is stored in the second memory 24.

The image data stored in the second memory 24 is outputted to the display 40 via the memory controller 20. The image data received by the display 40 is converted into a signal in a predetermined format (e.g. a color compound image signal in the NTSC format), and the image of the image data is displayed on the screen of the display 40. Through this procedure, the user (photographer) can check the image properties before recording by looking at the image (preview image) displayed on the display 40.

If the user wish to change the image properties of the image displayed on the display 40, the user inputs through the image property setting device 36 an instruction for changing the image property parameter that is intended to change by the user. Based on the changing instruction, the CPU 28 again executes image processing with respect to the data stored in the first memory 22 in accordance with the new image property parameter. The image data that is obtained as a result of re-processing the image by the signal processing part 26 based on the new image property parameter data designated by the user through the image property setting device 36 is stored in the second memory 24, and the image data after the changing is displayed on the display 40.

As presented above, the user can adjust image properties while checking the image at the display 40. When the user instructs recording of the image through the operating part 38 at the time the desired image property reproduction has been achieved, the CPU 28 transmits a command to the compression-expansion circuit 30 so that the compression-expansion circuit 30 compresses the data stored in the second memory 24 in accordance with a predetermined format such as JPEG. The compressed image data is recorded in a record medium such as the memory card 32 through the card interface 34. The memory card 32 is for example a smart media (Solid-State Floppy Disk).

The record medium is not limited to a smart media, and the record medium may be various devices such as a PC card, a compact flash, a magnetic disk, a laser disk, a laser magnetic disk, and a memory stick. A signal processing device and an interface corresponding with a medium to be used are applied to the card interface 34.

The operation part 38 is a block including operation buttons such as a shutter release button for instructing start of image capturing, the image property setting device 36 for selecting image property parameters, or for adjusting and changing a set value and so forth, a device for selecting a mode of the electronic camera 10, and various input devices. The operation part 38 may be provided in the body of the electronic camera 10, or may be a remote control transmitter provided separately from the body of the electronic camera 10.

The CPU 28 is a control part (control device) that unites and controls the circuits of the electronic camera 10, and is connected via a bus 42 to the memory controller 20, the first memory 22, the second memory 24, the signal processing part 26, the compression-expansion circuit 30, and the card interface 34, and so forth.

The CPU 28 controls an operation of the corresponding circuit, a zooming operation of the lens 12 and an automatic focus adjustment (AF) as well as an automatic exposure adjustment (AE), all based upon signals inputted through the operation part 38. The CPU 28 also serves as a display control part for controlling display of the display 40.

The display 40 displays not only the image captured by the CCD 14, but also a reproduced image based on the image data read out from the memory card 32 at a reproduction mode. The image data is periodically updated in accordance with the image signal outputted from the CCD 14, and a video signal produced from the image data is supplied to the display 40, whereby the image captured by the CCD 14 is displayed on the display 40 as a moving image at a real time (a live image), or a sequence of images which is almost a moving image even though it is not a real time image.

Thus, the display 40 is also used as an electronic view finder in the manner as described above. The user can confirm a view angle by a displayed screen on the display 40 or an optical finder. Then, in response to pressing the shutter release button of the operation part 38, capturing of the image data for record is started.

Next, an operation of the electronic camera 10 which is constructed as described above will be presented.

Figure 2:
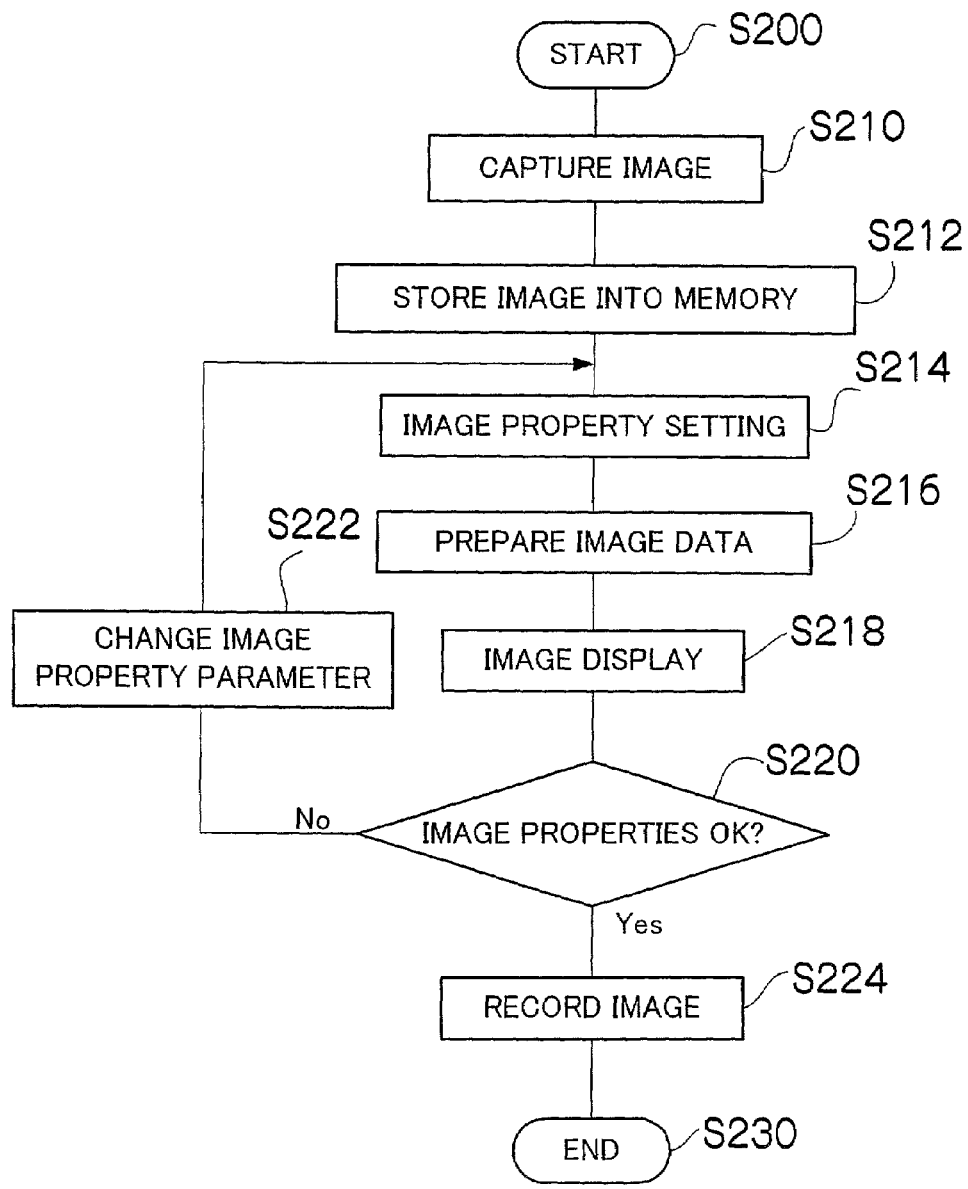
FIG. 2 is a flowchart illustrating a control procedure of a CPU of the electronic camera according to the embodiment of the present invention.

FIG. 2 is a flowchart showing a control procedure of the CPU 28 in the electronic camera 10 of the present embodiment. As seen from FIG. 2, when the control by the CPU 28 starts (S200) and a start of image capturing is instructed by an operation such as a press of the shutter release button, the CPU 28 performs an image capturing operation based on the instruction (S210). By that image capturing operation, the image data (CCD-raw data) read out from the CCD 14 is stored into the first memory 22 (S212).

Next, the CPU 28 obtains the data related to the image property parameters (S214), and prepares image data by processing the image data stored in the first memory 22 in accordance with the image property parameters (S216). The image property parameters at the initial state are set at the standard values (initial setting values).

Then, the image data that is obtained as a result of the image processing reflecting the image property parameters is displayed on the display 40 (S218). The user determines the image properties by checking the image on the display 40, and the user inputs that the image properties are OK if the image properties are satisfactory or inputs that the image property is NG if one or more of the image properties are unsatisfactory. The CPU 28 determines whether the image properties are satisfactory based on the signal inputted through the operating part 38 by the user (S220).

If the determination that the image property is NG (determination NO) is obtained at S220, the procedure is diverged into S222 and a process for changing the unsatisfied image property is performed. If the user is not satisfied to the image property of the image displayed on the display 40, the user selects the unsatisfied image property by operating the image property setting device 36, and adjusts and changes the parameter of the unsatisfied image property (S222). After that, the procedure returns to S214, and the image data stored in the first memory 22 is again processed based on the changed image property data, and the changed image is displayed on the display 40 (S216 and S218).

The procedure from S214 through S222 is repeatedly executed until the user can obtain the image reproduction with the desired properties on the display 40. When the determination that the image properties are OK (determination YES) is obtained at S220, the procedure goes on to S224, and the recording process is executed for writing the image data being displayed on the display 40 into the memory card 32. When the image recording process is completed, the present control sequence is terminated (S230).

Figure 3:
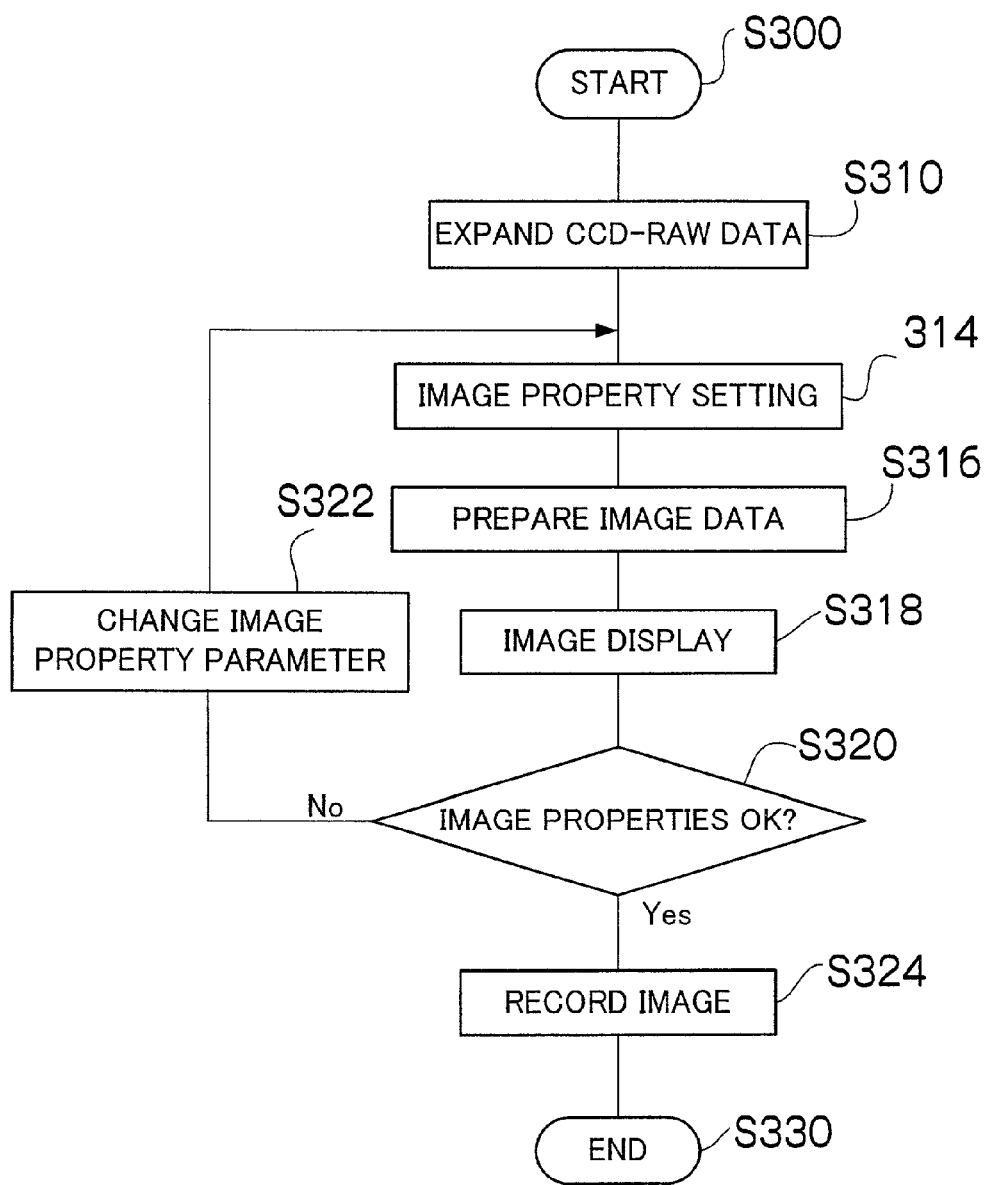
FIG. 3 is a flowchart illustrating a control procedure of the CPU of the electronic camera according to another embodiment of the present invention.

FIG. 3 is a flowchart showing another example of control procedure in the electronic camera 10. In the control procedure in FIG. 2, the CCD-raw data of the subject image that is captured by the CCD 14 is stored into the first memory 22, and the image data stored in the first memory 22 is processed and recorded; however, it is also possible to write the CCD-raw data into the memory card 32 so as to store the data.

FIG. 3 shows an example of control procedure in which the CCD-raw data has been stored in the memory card 32 beforehand, and the CCD-raw data is read out from the memory card 32 and processed.

In FIG. 3, when the present control sequence starts (S300), the CPU 28 reads out the CCD-raw data recorded in the memory card 32, and expands the read out data over the first memory 22. The procedure afterwards is the same as the S214 through S226, which are described with reference to FIG. 2.

The CPU 28 obtains the data related to the image property parameters (S314), and prepares image data by processing the image data stored in the first memory 22 in accordance with the image property parameters (S316). The image property parameters at the initial state are set at the standard values (initial setting values).

Then, the image data that is obtained as a result of the image processing reflecting the image property parameters is displayed on the display 40 (S318). The user determines the image properties by checking the image on the display 40, and the user inputs that the image properties are OK if the image properties are satisfactory or inputs that the image property is NG if one or more of the image properties are unsatisfactory. The CPU 28 determines whether the image properties are satisfactory based on the signal inputted through the operating part 38 by the user (S320).

If the determination that the image property is NG (determination NO) is obtained at S320, the procedure is diverged into S322 and a process for changing the unsatisfied image property is performed. If the user is not satisfied to the image property of the image displayed on the display 40, the user selects the unsatisfied image property by operating the image property setting device 36, and adjusts and changes the parameter of the unsatisfied image property (S322). After that, the procedure returns to S314, and the image data stored in the first memory 22 is again processed based on the changed image property data, and the changed image is displayed on the display 40 (S316 and S318).

The procedure from S314 through S322 is repeatedly executed until the user can obtain the image reproduction with the desired properties on the display 40. When the determination that the image properties are OK (determination YES) is obtained at S320, the procedure goes on to S324, and the recording process is executed for writing the image data being displayed on the display 40 into the memory card 32. The image data that is confirmed that its image properties are OK may be recorded in the same memory card 32 containing the CCD-raw data, or may be recorded into another memory card 32 by exchanging the memory cards. When the image recording process is completed, the present control sequence is terminated (S330).

Figure 4:
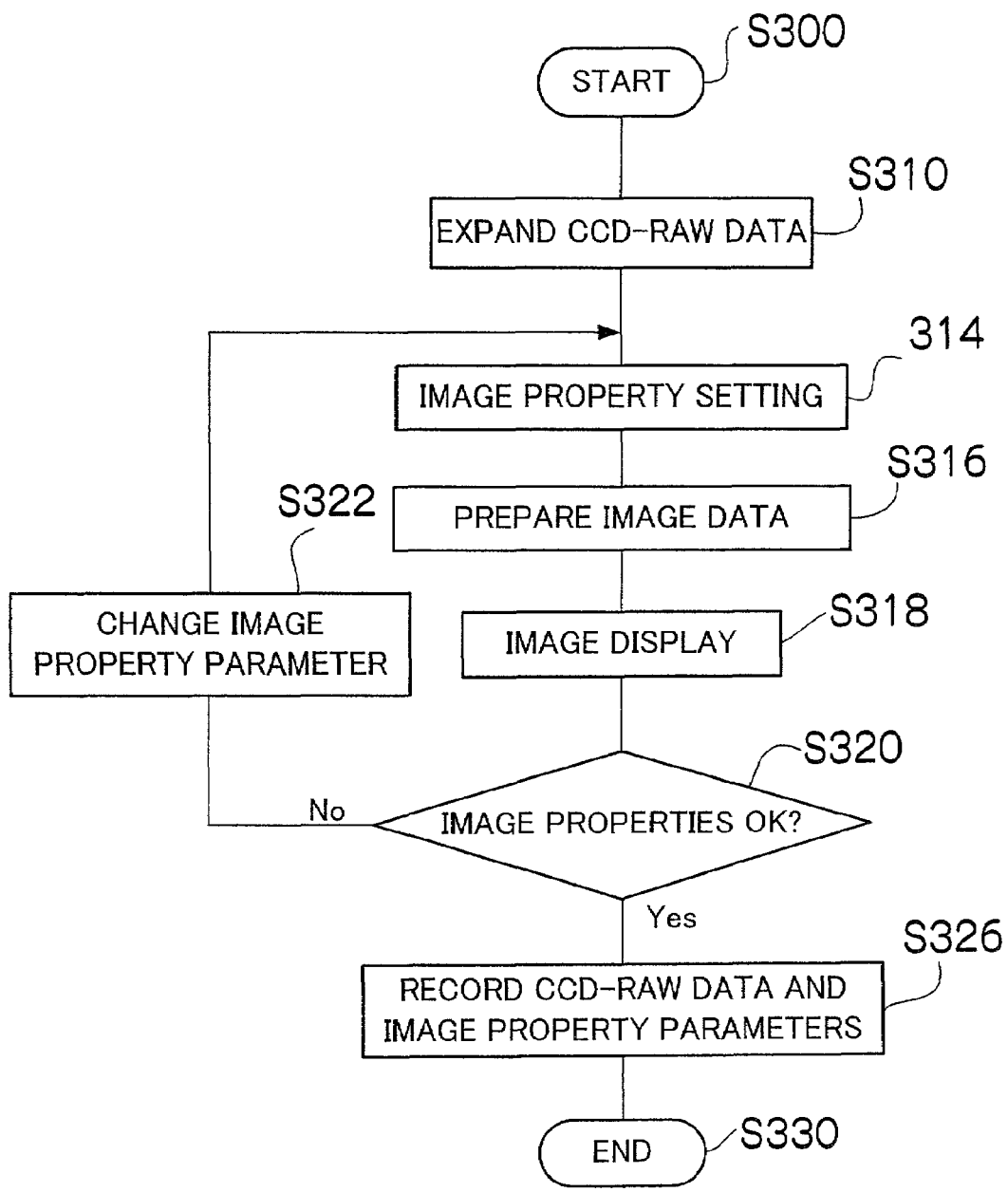
FIG. 4 is a flowchart illustrating a control procedure of the CPU of the electronic camera according to still another embodiment of the present invention.

FIG. 4 is an alternative example of the control sequence described with reference to FIG. 3. The steps (processes) in FIG. 4 that are common with ones in FIG. 3 are assigned the same reference numbers, and description for them is omitted.

At S324 in FIG. 3, the image data that is obtained as a result of processing the image data in accordance with the image property parameters is recorded in the memory card 32 in a case where the determination that the image properties are OK is obtained at S320. In contrast, in the control sequence in FIG. 4, S324 in FIG. 3 is replaced by S326; more specifically, if the determination that the image properties are OK is obtained at S320, the procedure goes on to S326 where the data of the image property parameters are added to the CCD-raw data, and the CCD-raw data and the image property parameters are associated with each other and recorded in the memory card 32 (S326 in FIG. 4).

According to the control sequence in FIG. 4, the data of the image property parameters and the CCD-raw data are associated with each other and are recorded in the memory card 32. Then, the content of the memory card 32 is read out by a device such as a personal computer and then the image is processed based on the data, whereby the image with the properties that are intended by the photographer (user) can be reproduced. An embodiment is also possible in which S224 in the control sequence described with reference to FIG. 2 is replaced by S326 in FIG. 4.

Figure 5:
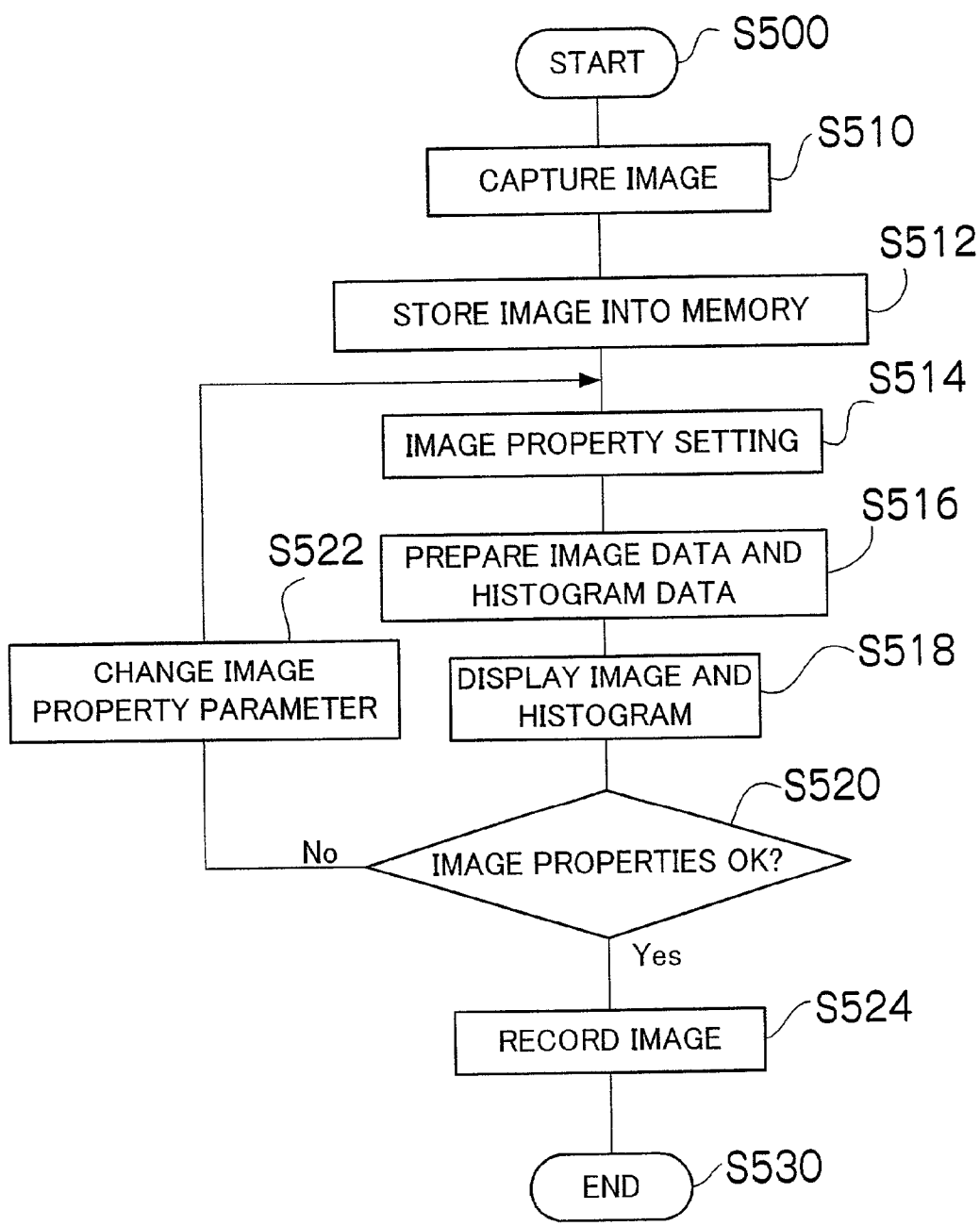
FIG. 5 is a flowchart illustrating a control procedure of the CPU of the electronic camera according to yet another embodiment of the present invention.

FIG. 5 is a flowchart showing still another example of control procedure for the CPU 28 in the electronic camera 10 of the present invention. As seen from FIG. 5, when the control by the CPU 28 starts (S500) and a start of image capturing is instructed by an operation such as a press of the shutter release button, the CPU 28 performs an image capturing operation based on the instruction (S510). By that image capturing operation, the image data (CCD-raw data) read out from the CCD 14 is stored into the first memory 22 (S512).

Next, the CPU 28 obtains the data related to the image property parameters (S514), and prepares image data and histogram data by processing the image data stored in the first memory 22 in accordance with the image property parameters (S516). The image property parameters at the initial state are set at the standard values (initial setting values).

The signal processing part 26 includes a histogram producing device, and prepares, in accordance with the instruction from the CPU 28, the histogram that shows a distribution of the integrated value with respect to the signal level with respect to the image data of one screen read out from the first memory 22.

Then, the image data and the histogram that are obtained as a result of the image processing reflecting the image property parameters are displayed on the display 40 (S518). The histogram may be displayed as a combination of the histogram of the brightness signal with the histogram of the color signals of R, G, and B, or may be displayed separately.

The histogram data may be overlapped on the image, or an image display screen and a histogram display screen may be shown alternately in response to an image switch instruction of the operation part 38. The display screen may also be divided so as to show the image and the histogram at the same time. After all, a construction is preferable in which the user can freely select through the operation part 38 a display among the above-described display methods depending on the user's preference.

The user determines whether the image properties are satisfactory by looking at the image and the histogram data on the display 40. If the image properties are satisfactory, the user inputs that the image properties are OK through the operation part 38. If one or more of the image properties are unsatisfied, the user inputs that the image properties are NG. The CPU 28 determines whether the image properties are satisfactory based on the signal inputted from the operation part 38 (S520).

If the determination that the image property is NG (determination NO) is obtained at S520, the procedure is diverged into S522 and a process for changing the unsatisfied image property is performed. If the user is not satisfied to the image property of the image displayed on the display 40, the user selects the unsatisfied image property by operating the image property setting device 36, and adjusts and changes the parameter of the unsatisfied image property (S522). After that, the procedure returns to S514, and the image data stored in the first memory 22 is again processed based on the changed image property data, and the changed image and histogram are displayed on the display 40 (S516 and S518).

The procedure from S514 through S522 is repeatedly executed until the user can obtain the image reproduction with the desired properties on the display 40. When the determination that the image properties are OK (determination YES) is obtained at S520, the procedure goes on to S524, and the recording process is executed for writing the image data being displayed on the display 40 into the memory card 32. When the image recording process is completed, the present control sequence is terminated (S530).

Step 524 may be replaced by S326 described with reference to FIG. 4.

In the example of FIG. 5, both the image and the histogram are displayed as auxiliary means for the user to determine the image properties at the time of image property setting; however, an average level, a peak level, and a bottom level of the image signal may be displayed instead of, or in addition to, the histogram display.

In the above-described embodiment, the image data is recorded in the memory card 32; however, instead of, or in addition to, the memory card 32, a storing device for containing the image data may be provided within the electronic camera 10, and at the same time, a communication interface device (communication device) that can exchange data with an external device may be added to the electronic camera 10 so that the image data stored in the storing device in the electronic camera 10 can be transferred to the external device such as a personal computer via the communication interface.

Moreover, in examples presented in the above-described embodiment, the present invention is applied to the electronic still camera for recording still images; however, the range of application of the present invention is not limited to that. The present invention can also be applied to an electronic camera for recording moving images, and to an electronic camera that has a function to record both still and moving images. In the electronic camera that can records moving images, a video button for instructing start/stop of image-capturing is provided as a record instructing device instead of the shutter release button.

As described above, the electronic camera of the present invention has a device which stores the unprocessed data (data before image processing) of the imaging signal that is outputted from the imaging device and is converted from an analog form to a digital form, and the electronic still camera re-processes data based on the unprocessed data in response to an instruction for changing the image property from the image property setting device; therefore, the image property can be changed without deteriorating the image quality or capturing an image again.

Further, since the electronic camera of the present invention records and stores the unprocessed data and the image property parameter data with associating them with each other; thus the property parameter of the image that has been recorded once can be changed without deteriorating the quality of the image.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera, comprising:
an imaging device which converts an optical image into an analog image signal;
an A/D converter which converts the analog image signal outputted from the imaging device into a digital image signal;
an unprocessed data storing device which stores the digital image signal outputted from the A/D converter as unprocessed image data;
a signal processing device which processes the unprocessed image data read out from the unprocessed data storing device into a processed image data in accordance with an image property parameter;
an image property setting device through which an instruction is inputted to change data of the image property parameter;
a display which displays an image represented by the processed image data processed by the signal processing device in accordance with the data of the image property parameter set with the image property setting device;
a compression process device which compresses the processed image data; and
a recording device which records the processed image data compressed by the compression process device in a recording medium,
wherein the display displays at least one of histogram, average level, peak level, and bottom level of the result of the image processing, which is processed according to the image property setting designated by a user,
wherein the image property setting device and the signal processing device work cooperatively to repeatedly query whether a user is satisfied with the processed image data, query for changes to the image property parameter in the event that the user is not satisfied, and process the unprocessed image data to produce a new processed image data in accordance with the correspondingly changed image property parameter until the user is satisfied, an image represented by the new processed image data is displayed on the display, and
wherein when the user is satisfied, the compression process device compresses image data corresponding to the processed image data displayed on the display and the recording device stores the compressed image data in the recording medium.

2. The electronic camera of claim 1, wherein the unprocessed image data stored in the unprocessed image data storing device includes supplemental data that covers a defective pixel data.

3. The electronic camera of claim 1, wherein the recording medium is a removable memory medium.

4. The electronic camera of claim 1, wherein the imaging parameter includes at least one of white balance, gradation, brightness, tonality, and sharpness.

5. The electronic camera of claim 1, further comprising:
an instruction input device which inputs a recording instruction for the processed image data corresponding to the image displayed on the display to be recorded in the recording medium,
wherein the instruction input device inputs the recording instruction when the user indicates satisfaction with the processed image data.

6. The electronic camera of claim 5, further comprising:
a processed data storing device which stores the processed image data processed by the signal processing device,
wherein the display displays the image represented by the processed imaged data stored in the processed data storing device, and
wherein the compression process device compresses the processed image read data from the processed data storing device.

7. An electronic camera, comprising:
an imaging device which converts an optical image into an analog image signal;
an A/D converter which converts the analog image signal outputted from the imaging device into a digital image signal;
a first buffer which stores the digital image signal outputted from the A/D converter as unprocessed image data;
a signal processing device which processes the unprocessed image data read out from the first buffer into a processed image data in accordance with an image property parameter;
a second buffer which stores processed image data outputted from the signal processing device;
an image property setting device through which an instruction is inputted to change data of the image property parameter; and
a display which displays an image represented by the processed image data processed by the signal processing device in accordance with the data of the image property parameter set with the image property setting device;
a compression process device which compresses the processed image data read from the second buffer; and
a recording device which records the processed image data compressed by the compression process device in a recording medium,
wherein the image property setting device and the signal processing device work cooperatively to repeatedly query whether a user is satisfied with the processed image data, query for changes to the image property parameter in the event that the user is not satisfied, and process the unprocessed image data to produce a new processed image data in accordance with the correspondingly changed image property parameter until the user is satisfied, the new processed image data being stored in the second buffer and an image represented by the new processed image data is displayed on the display, and
wherein when the user is satisfied, the compression device compresses image data corresponding to the processed image data read from the second buffer and the recording device stores the compressed image data in the recording medium.

8. The electronic camera of claim 7, wherein the unprocessed image data stored in the first buffer includes supplemental data that covers a defective pixel data.

9. The electronic camera of claim 7, further comprising:
an instruction input device which inputs a recording instruction for the processed image data corresponding to the image displayed on the display to be recorded in the recording medium,
wherein the instruction input device inputs the recording instruction when the user indicates satisfaction with the processed image data.

10. The electronic camera of claim 7, wherein the recording medium is a removable memory medium.

11. The electronic camera of claim 7, wherein the imaging parameter includes at least one of white balance, gradation, brightness, tonality, and sharpness.

12. An image processing method, comprising:
retrieving unprocessed data from an unprocessed data storage device;
processing the unprocessed data into processed image data based on imaging parameters;
querying whether a user is satisfied with the processed image data;
querying for changes to the imaging parameters in the event that the user is not satisfied;
processing the unprocessed image data based on changes to the imaging parameters;
repeating the querying and processing steps until the user indicates satisfaction; and
compressing the processed image data and storing the compressed image data in a recording medium when the user indicates satisfaction.

13. The method of claim 12, wherein the recording medium is a removable memory medium.

14. The method of claim 12, further comprising displaying on a display an image corresponding to the processed image data, the imaging parameters, and at least one of a histogram average level, peak level, and bottom level of the processed image data.

15. The method claim 12, wherein the unprocessed image data stored in the unprocessed image data includes supplemental data that covers a defective pixel data.

16. The method of claim 12, wherein the imaging parameters include at least one of white balance, gradation, brightness, tonality, and sharpness.

17. The method of claim 16, further comprising displaying on a display an image corresponding to the processed image data, the imaging parameters, and at least one of a histogram average level, peak level, and bottom level of the processed image data.

18. An electronic camera, comprising:
an imaging device which converts an optical image into an analog image signal;
an A/D converter which converts the analog image signal outputted from the imaging device into a digital image signal;
a first memory which stores a first image data that is outputted from the A/D converter as unprocessed image data after the conversion;
a signal processing device which processes the first image data read out from the first memory in accordance with an image property parameter;
an image property setting device through which an instruction is inputted to change data of the image property parameter;
a second memory which stores a second image data obtained by processing the first image data in the signal process device according to the data of the image property parameter set with the image property setting device;
a display which displays an image represented by the second image data stored in the second memory;
an instruction input device which inputs a recording instruction for the second image corresponding to the image displayed on the display to be recorded in a recording medium;
a compression process device which compresses the second image data according to the recording instruction from the instruction input device; and
a recording device which records the second image data compressed by the compression process device in the recording medium,
wherein when the recording instruction is not inputted by the instruction input device and the instruction to change data of the image property parameter is inputted by the image property setting device, a new second image data is produced by the signal processing device by processing the first image data according to the changed data of the image property parameter, the new second image data is stored in the second memory and an image represented by the new second image data stored in the second memory is displayed on the display, and
wherein when the recording instruction is inputted by the instruction input device, the second image data corresponding to the image displayed on the display is compressed by the compression process device and recorded in the recording medium as compressed image data.

19. The electronic camera of claim 18, wherein the recording medium is a removable memory medium.

20. The electronic camera of claim 18, wherein the imaging parameter includes at least one of white balance, gradation, brightness, tonality, and sharpness.

* * * * *